May 3, 1960    D. W. FOX ET AL    2,935,487
POLYESTER-POLYISOCYANATE INSULATING MATERIALS
Filed May 31, 1956
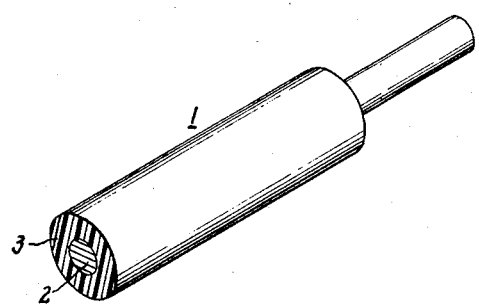
Inventors:
Daniel W. Fox,
Algerd F. Zavist,
by
Their Attorney.

United States Patent Office 2,935,487
Patented May 3, 1960

2,935,487

POLYESTER-POLYISOCYANATE INSULATING MATERIALS

Daniel W. Fox, Pittsfield, Mass., and Algerd F. Zavist, Schenectady, N.Y., assignors to General Electric Company, a corporation of New York Application May 31, 1956, Serial No. 588,557

15 Claims. (Cl. 260—45.4)

The present invention relates to new and useful polyester resin base compositions and to structures coated therewith. More particularly the invention relates to such materials which are solderable or capable of being removed from the coated structure by dipping into molten solder but which have the desirable physical characteristics, and especially the thermal stability, of the polyester resin base material.

With the increasing use of automatic machinery there has arisen a need for enamels or coatings such as those for electrical conductors which, when such conductors coated therewith are dipped into molten solder, will be removed leaving a bare conductor which in the same dipping action is soldered to any desired object. Thus to solder two or more wires as of copper, aluminum, steel, etc. coated with such an enamel it would only be necessary to dip the portions to be soldered in molten solder for a few seconds. Such solderable compositions or enamels are now commercially available. However, so far as is known such wire enamels and particularly those containing isocyanate material are characterized by physical qualities and particularly a lack of heat stability which limits their use in electrical equipment operating at temperatures up to about 135° C. or higher.

It is an object, then, of this invention to provide a polyester resin base composition which is solderable but which has the desirable physical characteristics of the polyester resin base material and, in particular, its heat stability.

Briefly stated the invention comprises the method and the material resulting from the admixture of (1) a composition consisting essentially of the reaction product of (a) from about 25 to 56 equivalent percent of a lower dialkyl ester of a member selected from the class consisting of isophthalic acid and terephthalic acid and mixtures of such members, (b) from about 15 to 46 equivalent percent of ethylene glycol, and (c) from 13 to 44 equivalent percent of a saturated aliphatic polyhydric alcohol having at least three hydroxyl groups and (2) a polyisocyanate. The invention also comprises structures coated with or made up of such material.

The features of the invention which are believed to be novel are set forth with particularity in the claims appended hereto. The invention, however, both as to its organization and method of operation, together with further objects and advantages thereof, may best be understood by reference to the following description and the drawing in which the single figure, drawn in exaggerated scale, shows a wire coated with the new materials.

The polyester materials used in conjunction with this invention are described in detail in copending application Serial Number 474,624, filed December 10, 1954, assigned to the same assignee as the present invention and included herein by reference. Briefly the polyester resin comprises (a) from about 25 to 56 equivalent percent, preferably from 36 to 50 equivalent percent, of a lower dialkyl ester of a member selected from the class consisting of isophthalic acid and terephthalic acid and mixtures thereof, (b) from about 15 to 46 equivalent percent, and preferably from 25 to 40 equivalent percent of ethylene glycol and (c) from about 13 to 44 equivalent percent, and preferably from 20 to 32 equivalent percent of a saturated aliphatic polyhydric alcohol having at least three hydroxyl groups. Typical of the isophthalic and terephthalic acid esters which may be used are those dialkyl esters containing from 1 to 8 and preferably from 1 to 4 carbon atoms including the dimethyl, diethyl, dipropyl, dibutyl, etc. esters. The terms "polyhydric alcohol" and "saturated aliphatic polyhydric alcohol having at least three hydroxyl groups" includes both polyhydric alcohols in which the hydroxyl groups are connected by a plurality of carbon to carbon linkages as well as other alcohols having three or more hydroxyl groups such as glycerin, 1,1,1-trimethylol ethane, sorbitol, mannitol, diglycerol, dipentaerythritol, etc.

The term "equivalent percent" is employed in its usual sense herein, it being the number of equivalents of the reactant divided by the total number of equivalents of all reactants times one hundred. The number of equivalents of a reactant is the number of moles of the reactant multiplied by the number of functional groups such as carboxyl, ester, hydroxyl isocyanate, etc. Thus the equivalents of dimethyl terephthalate is the number of moles of this material multiplied by two, for glycerin the number of moles times three, and for ethylene glycol the number of moles times two.

Typical of the polyesters, along with the others described in the above cited copending application, which can be used in the practice of the invention is one prepared from the following ingredients:

Dimethyl terephthalate ____ 46 equiv. percent (3 moles).
Ethylene glycol _____ 31 equiv. percent (2 moles).
Glycerin (95%) _____ 23 equiv. percent (1 mole).

The above materials are added along with xylene or a similar solvent, to prevent sublimation of lower dialkyl esters of the acids, to a three-necked flask having a thermometer, stirrer and a Vigreux column with a Dean and Stark trap and funnel on the column. A nitrogen blanket is also provided for the system. The system is heated for about 30 minutes during which time the pot temperature rises to about 130° C. and the water and xylene azeotropically distill from the system. Then about 0.03 percent by weight of lead acetate as an alcoholysis catalyst based on the weight of the dimethyl terephthalate is added and heating continued for about three and one-half hours to a final temperature of about 240° C. Sufficient cresol is added to form a solution having a solids content of 37 percent by weight. Other solvents which can be used include the xylenols, polyhydroxy benzenes, xylene and the higher boiling petroleum hydrocarbons. It will be realized, of course, that other alcoholysis catalysts can be used such as lead oxides, zinc oxide, cadmium acetate, cuprous acetate, zinc acetate, etc.

The polyisocyanate material used in this connection can vary widely and is typically the reaction product of an isocyanate such as tolylene diisocyanate, naphthalene diisocyanate, 1,6 hexane diisocyanate, etc., with a polyol in proper equivalent proportions. Such polyols include glycerol, ethylene glycol, diethylene glycol, propylene glycol, dipropylene glycol, trimethylol ethane or propane, hexane triol and the like. For example, 3 moles of tolylene diisocyanate and one mole of hexane triol are reacted and blocked if desired with three moles of phenol. Propylene glycol is combined in the proportion of one mole to two moles of tolylene diisocyanate as in the case of dipropylene glycol and tolylene diisocyanate. The polyisocyanate material can be masked or blocked in the well known manner with materials such as phenolic compounds or may be left unblocked. If desired the polyisocyanate can be used without reaction with a polyol or polyols, the purpose of the latter being to reduce the vapor pressure of the diisocyanate.

The polyisocyanate material is prepared in the form of a solution in a solvent such as cresol, xylenol, xylene, higher boiling petroleum hydrocarbons and the like before being added to the polyester solution, the amount of polyester and polyisocyanate solids in the solution depending upon the method of application of the coating composition. If an unblocked polyisocyanate is used, materials such as ethyl acetate may also be used as a solvent. Typically for application to a 30–40 mil wire by dipping and passing through a die or wiper a 37 percent by weight solution of the polyisocyanate in a high boiling petroleum hydrocarbon, cresol or other solvent or a mixture of solvents is added to the 37 percent by weight solution of the polyester and the resultant mixture diluted to 25 percent by weight solids.

When less than the theoretical or stoichiometric amount of one equivalent of polyisocyanate material is used with each equivalent of polyester, the enamel obtained will not solder or solders with difficulty at temperatures up to about 450° C. or is not suitably solvent resistant or abrasion resistant. However, it has been found that when the polyisocyanate material is used in excess of the stoichiometric amount or in amounts of about two or more and preferably from about two to eight equivalents of polyisocyanate for each equivalent of the particular polyesters described herein, an enamel is obtained which will solder in three seconds or less at 375° C. Furthermore, it has been unexpectedly found that the enamel left on the wire particularly at elevated temperatures has good thermal stability, which is characteristic of the polyester portion of the enamel. It is to be understood that there is no real upper limit to the amount of polyisocyanate which can be used. However, it has been found that when more than about eight equivalents of polyisocyanate are used for each equivalent of polyester, the excess polyisocyanate merely vaporizes or passes off with a resulting thinner build and attendant poorer electrical properties.

The following examples are given in the way of illustrating the invention and are not to be taken as limiting thereof.

*Example 1*

One equivalent of the polyester described above in solution was combined with two equivalents of a polyisocyanate prepared by reacting 3 moles toluene-diisocyanate and one mole of hexanetriol and blocking with 3 moles of phenol. A 36 mil diameter wire was passed through the coating solution containing 25 percent by weight solids at a speed of 35 feet per minute, then through a wiper or die and through a twelve foot vertical oven having an entrance temperature of about 170° C. and exit temperature of about 345° C. The resultant insulated wire is shown as 1 in the drawing, the wire 2 being coated with a smooth film of insulating material 3. The build of enamel on the wire, or the difference in the diameter of the coated and uncoated wire, was about 1.4 mils and the wire was solderable when dipped for 3 seconds in molten solder at 375° C. When tested for abrasion resistance according to NEMA Standard MW–24 wherein a round steel needle is rubbed repeatedly across the enamel surface under a load of 430 grams, the above enamel withstood 42 strokes or abrasions of the needle before it was worn away. An enamel which will withstand 30 strokes is acceptable for electrical wires which are to be physically handled as by forming into coils with automatic equipment or tamping into machine slots.

The above enamel was tested for resistance to solvent attack by immersing a sample of coated wire in a boiling solution of a 30 percent by volume toluene and 70 percent alcohol consisting in turn of 100 parts by volume of U.S.P. ethanol and 5 parts by volume of C.P. methanol. After a standard test time of five minutes partially immersed in the boiling solvent, no swelling, blistering, softening or other defect was observable. The electrical breakdown voltage of the coating was found to be about 3000 volts per mil.

A sample of the wire coated as above was also tested for thermal stability or heat aging. After 400 hours at 155° C. the wire coating did not crack or craze when bent around a mandrel having a diameter three times that of the wire.

*Example 2*

A 36 mil diameter wire was coated as in Example 1 above, however, using a wire enamel solution containing one and one-half equivalents of the polyester resin to each two equivalents of the polyisocyanate material, the wire speed being as in Example 1, 35 feet per minute. A build of 1.4 mils was noted on the wire. While this wire soldered satisfactorily in 3 seconds at 375° C. and withstood the 5 minute solvent test, its abrasion resistance tested as above was 7 strokes. The example shows that when the polyester is used in about the same equivalent amount as the polyisocyanate, a more readily abradable enamel is obtained, which, while useful for purposes where physical handling is light, is not suitable for rough handling. When this example was repeated with a wire speed of 30 feet per minute the average abrasion resistance was only 12 strokes and the wire did not solder satisfactorily at 375° C. taking 10 seconds for the fusion of the coating which is an excessive amount of time for practical purposes.

*Example 3*

Example 1 was repeated using, however, four equivalents of polyisocyanate material to each equivalent of the polyester material with a wire speed of 30 feet per minute which gave a build or coating of 1.6 mils. The average abrasion resistance was 53 strokes. This wire successfully withstood the solvent test for 10 minutes and soldered satisfactorily at 375° C. in three seconds. With a wire speed of 35 feet per minute and a build of about 1.3 mils, the average abrasion resistance was 36 strokes. This coated conductor also withstood the solvent test for 10 minutes and soldered satisfactorily at 375° C. in three seconds.

*Example 4*

Example 1 was repeated using three equivalents of polyisocyanate material to each equivalent of polyester in the solution. With a wire speed of 30 feet per minute and a build of 2.2 mils the abrasion resistance was 35 strokes. The conductor successfully withstood the solvent resistance test for 10 minutes and satisfactory solderability was achieved in 3 seconds at 375° C. With a wire speed of 35 feet per minute and a build of 1.6 mils the average abrasion resistance was 42 strokes. This conductor successfully withstood the solvent test for 5 minutes and soldered satisfactorily at 375° C. in three seconds.

*Example 5*

Example 1 was repeated except that one equivalent of polyisocyanate material was used for each equivalent of polyester resin in the solution. At a wire speed of 30 feet per minute and build of 1.7 mils the abrasion resistance was only 12 strokes and the solderability was unsatisfactory taking about 10 seconds at 375° C. At a wire speed of 35 feet per minute and a build of 1.5 mils the average abrasion resistance was only 5 strokes although the solderability was satisfactory in three seconds at 375° C. Here again was a wire which has a limited range of use.

*Example 6*

Example 1 was repeated using one equivalent of polyisocyanate material to two equivalents of polyester material in solution. At wire speeds of 35, 40, and 45 feet per minute respectively and builds of 1.5, 1.5, and 1.3 mils, the abrasion resistance ranged from 17 strokes down to 4 strokes and the solderability was unsatisfactory since complete fusion did not occur in ten seconds at 375° C.

*Example 7*

Example 1 was repeated except that eight equivalents of polyisocyanate material were used for each equivalent of polyester material in the solution. With a wire speed of 30 feet per minute and a build of 1.3 mils, the average abrasion resistance was 50 strokes. This coated wire also withstood the solvent resistance test for ten minutes and soldered satisfactorily in three seconds at 375° C. With a wire speed of 35 feet per minute and a build of 1.4 mils, the average abrasion was 62 strokes and the material again soldered satisfactorily at 375° C. in three seconds. There was very slight attack in the solvent resistance test after five minutes which did not detract from the general usefulness of the wire.

*Example 8*

Example 1 was repeated except that the polyisocyanate material used was of the unblocked or unmasked type, that is, the isocyanate groups were not reacted with phenolic material. When one equivalent of the unblocked polyisocyanate material was used with each equivalent of polyester resin in solution at a wire speed of 45 feet per minute, the wire so coated had an abrasion resistance of 28 strokes, was slightly attacked in the five minute solvent resistance test and soldered satisfactorily at 375° C. in three seconds.

*Example 9*

Example 8 was repeated using four equivalents of unblocked polyisocyanate for each equivalent of polyester resin in solution. At a speed of 35 feet per minute and a build of 1.5 mils, the average abrasion resistance was 33 strokes. This coated conductor also passed the five minute solvent resistance test and soldered in three seconds at 375° C.

*Example 10*

Example 8 was repeated using five and one-half equivalents of unblocked polyisocyanate material for each equivalent of polyester resin in solution at a wire speed of 35 feet per minute and a build of 1.5 mils, the abrasion resistance was 52 strokes. This material soldered satisfactorily in three seconds at 375° C. and was only slightly marked although not damaged during the five minute solvent resistance test.

*Example 11*

Example 8 was repeated except that eleven equivalents of polyisocyanate material were used for each equivalent of polyester resin in solution. At a speed of 30 feet per minute and a build of 1.3 mils, the abrasion resistance was 28. The solvent resistance at ten minutes was satisfactory and the wire soldered properly in three seconds at 375° C.

It will be noted that in the above examples, the conductors used were some 36 mils in diameter. It will be realized, of course, that the particular coating solution used can be adapted as to its solid content in well known manners to accommodate or properly coat wires of smaller or larger diameters. Such techniques are well known to those skilled in the art. It will also be realized that the ease of solderability of a coated wire depends upon the diameter of the conductor itself, hence wires having a smaller diameter will solder in substantially lower times or at lower temperatures as those shown in the examples above.

As in the case of Example 1, the coated conductors set forth in Examples 2 through 11 above when aged at 155° C. for 400 hours were not damaged in any way when wrapped around a mandrel having a diameter three times that of the wire. While combinations of polyisocyanate materials with resinous materials and, in fact, even with polyesters have been known which would solder as do the material set forth herein, it is totally unexpected that such materials should have the salutary resistance to heat or heat stability which characterizes the materials of this invention. For example, it has been known to provide heat solderable wire enamels consisting of polyisocyanate material and polyvinyl formal resins or polyester resins. However, after heating for 75 to 125 hours at 155° C. as in a practical application in an electrical machine, the best known of such prior art coatings craze, crack, and fail. Such is not true of our materials which as pointed out above had not failed when heated at 155° C. for 400 hours.

From the above it will be noted that the most efficacious equivalent ratio of polyisocyanate material to polyester ranges from eight to about two. As shown in the examples above, when this ratio was departed from or less polyisocyanate was used, the resultant coating failed in one or more respects although such coatings may be used where less strenuous conditions are imposed. When more polyisocyanate is used a thinner coating results for the amount of material used.

By this invention there is provided a composite coating composition and structures embodying such compositions which are solderable merely by dipping the coated structure, such as wire, in molten solder. Furthermore, and most unexpectedly, when the wire is later exposed to higher temperatures such as in electrical apparatus the material reverts to the high temperature stability and other desirable characteristics of the polyester base ingredient.

What we claim as new and desire to secure by Letters Patent of the United States is:

1. A composition of matter comprising (1) one equivalent of a composition consisting essentially of the resinous reaction product of (a) from about 25 to 56 equivalent percent of a lower dialkyl ester of a member selected from the class consisting of isophthalic acid and terephthalic acid and mixtures thereof, (b) from about 15 to 46 equivalent percent of ethylene glycol, and (c) 13 to 44 percent of a saturated aliphatic polyhydric alcohol having at least three hydroxyl groups, and (2) at least about two equivalents of an organic polyisocyanate said equivalent of polyisocyanate being equal to the number of moles of polyisocyanate multiplied by the number of isocyanate groups in said polyisocyanate.

2. The composition of claim 1 in which the lower dialkyl ester is a lower dialkyl ester of terephthalic acid.

3. The composition of claim 1 in which the lower dialkyl ester is a lower dialkyl ester of isophthalic acid.

4. The composition of claim 1 in which the lower dialkyl ester is dimethyl terephthalate.

5. The composition of claim 1 in which the lower dialkyl ester is dimethyl isophthalate.

6. The composition of claim 1 in which the polyhydric alcohol is glycerin.

7. The composition of claim 1 in which the polyhydric alcohol is 1,1,1-trimethylol ethane.

8. The composition of claim 1 in which the polyhydric alcohol is 1,1,1-trimethylol propane.

9. The composition of claim 1 in which the polyhydric alcohol is pentaerythritol.

10. The composition of claim 1 in which the polyhydric alcohol is sorbitol.

11. The composition of claim 1 in which the polyisocyanate is the product of reaction of a diisocyanate and an aliphatic polyhydroxyl compound.

12. The composition of claim 1 in which the polyisocyanate is the product of reaction of a polyisocyanate and an aliphatic polyhydroxyl compound.

13. The composition of claim 1 in which the polyisocyanate is the product of reaction of a polyisocyanate and an aliphatic polyhydroxyl compound in which substantially all of the free isocyanate groups are reacted with a phenol.

14. A composition of matter comprising (1) one equivalent of a composition consisting essentially of the resinous reaction product of (a) from about 36 to 50 equivalent percent of a lower dialkyl ester of a member selected from the class consisting of isophthalic acid and terephthalic acid and mixtures thereof, (b) from about 25 to 40 equivalent percent of ethylene glycol, and (c) 20 to 32 percent of a saturated aliphatic polyhydric alcohol having at least three hydroxyl groups, and (2) at least about two equivalents of an organic polyisocyanate said equivalents of polyisocyanate being equal to the number of moles of polyisocyanate multiplied by the number of isocyanate groups in said polyisocyanate.

15. A composition of matter comprising (1) one equivalent of a composition consisting essentially of the resinous reaction product of (a) from about 25 to 56 equivalent percent of a lower dialkyl ester of a member selected from the class consisting of isophthalic acid and terephthalic acid and mixtures thereof, (b) from about 15 to 46 equivalent percent of ethylene glycol, and (c) 13 to 44 percent of a saturated aliphatic polyhydric alcohol having at least three hydroxyl groups, and (2) from about two to eight equivalents of an organic polyisocyanate said equivalents of polyisocyanate being equal to the number of moles of polyisocyanate multiplied by the number of isocyanate groups in said polyisocyanate.

References Cited in the file of this patent

UNITED STATES PATENTS

| 2,333,639 | Christ et al. | Nov. 9, 1943 |
| 2,606,162 | Coffey et al. | Aug. 5, 1952 |
| 2,676,164 | Charlton et al. | Apr. 20, 1954 |

FOREIGN PATENTS

| 650,358 | Great Britain | Feb. 21, 1951 |